United States Patent
Jeon et al.

(10) Patent No.: US 9,423,661 B2
(45) Date of Patent: Aug. 23, 2016

(54) LIQUID CRYSTAL DISPLAY

(71) Applicant: SAMSUNG DISPLAY CO., LTD., Yongin, Gyeonggi-Do (KR)

(72) Inventors: Jae-Hwan Jeon, Seoul (KR); Kee Byem Kim, Cheonan-si (KR); Sang Hwan Lee, Asan-si (KR); Jae Hun Chung, Suwon-si (KR); Ki Seok Cha, Yongin-si (KR); Ho Kyoon Kwon, Seoul (KR); Yun Soo Kim, Asan-si (KR); Dae Ho Song, Jeollabuk-do (KR); Young Dae Song, Busan (KR); Sang A An, Daejeon (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 94 days.

(21) Appl. No.: 14/264,482

(22) Filed: Apr. 29, 2014

(65) Prior Publication Data
US 2015/0177548 A1    Jun. 25, 2015

(30) Foreign Application Priority Data
Dec. 19, 2013    (KR) .......................... 10-2013-0159622

(51) Int. Cl.
*G02F 1/1333*    (2006.01)
*G02F 1/1345*    (2006.01)

(52) U.S. Cl.
CPC ...... *G02F 1/13452* (2013.01); *G02F 1/133308* (2013.01); *G02F 2001/133314* (2013.01); *G02F 2001/133317* (2013.01)

(58) Field of Classification Search
CPC ........ G02F 2001/133314; G02F 2001/133317; G02F 1/1333; G02F 1/133308; G02F 1/136209
See application file for complete search history.

(56) References Cited

U.S. PATENT DOCUMENTS

| | | | |
|---|---|---|---|
| 6,320,629 B1 | 11/2001 | Hatano et al. | |
| 7,030,947 B2 | 4/2006 | Moon et al. | |
| 7,259,806 B1 | 8/2007 | Lee et al. | |
| 7,330,226 B2 | 2/2008 | Kim | |
| 8,879,027 B2 * | 11/2014 | Ishii | G02F 1/133382 345/90 |
| 2004/0201812 A1 | 10/2004 | Chu et al. | |

(Continued)

FOREIGN PATENT DOCUMENTS

| | | |
|---|---|---|
| JP | 11-288003 | 10/1999 |
| JP | 4004457 | 8/2007 |

(Continued)

*Primary Examiner* — Richard Kim
*Assistant Examiner* — Kendrick Hsu
(74) *Attorney, Agent, or Firm* — F. Chau & Associates, LLC

(57) ABSTRACT

A liquid crystal display includes: a bottom chassis, a backlight assembly received in the bottom chassis, a liquid crystal display panel including a thin film transistor substrate and a counter substrate disposed opposite the thin film transistor substrate, with the liquid crystal display panel being disposed so that the counter substrate faces the backlight assembly. The liquid crystal display further includes a mold structure disposed between the bottom chassis and the liquid crystal display panel, and configured to fasten the liquid crystal display panel to the bottom chassis, a driving connection line connected to the thin film transistor substrate and a shield case configured to cover the driving connection line to protect the driving connection line, and including a lateral side disposed corresponding to an edge of the liquid crystal display panel or disposed inside the edge of the liquid crystal panel.

19 Claims, 16 Drawing Sheets

(56) References Cited

U.S. PATENT DOCUMENTS

| | | | |
|---|---|---|---|
| 2012/0162563 A1* | 6/2012 | Lai | H05K 9/0054 349/58 |
| 2012/0168761 A1 | 7/2012 | Park et al. | |
| 2012/0224117 A1* | 9/2012 | Miyazaki | G02F 1/13318 349/58 |
| 2013/0027857 A1 | 1/2013 | Jeong | |
| 2013/0050820 A1 | 2/2013 | Shin | |
| 2013/0155351 A1* | 6/2013 | Garelli | G02B 6/001 349/64 |

FOREIGN PATENT DOCUMENTS

| | | |
|---|---|---|
| JP | 5066940 | 8/2012 |
| KR | 1019970022428 | 5/1997 |
| KR | 1020030069342 | 8/2003 |
| KR | 100580824 | 5/2006 |
| KR | 1020060038148 | 5/2006 |
| KR | 1020080028580 | 4/2008 |
| KR | 100977734 | 8/2010 |
| KR | 1020110020050 | 3/2011 |
| KR | 1020120004648 | 1/2012 |
| KR | 1020130005217 | 1/2013 |
| KR | 1020130011175 | 1/2013 |
| KR | 1020130020470 | 2/2013 |
| KR | 1020130022802 | 3/2013 |
| KR | 1020130024163 | 3/2013 |
| KR | 1020130141865 | 12/2013 |
| KR | 1020130142750 | 12/2013 |

* cited by examiner

LIQUID CRYSTAL DISPLAY

CROSS-REFERENCE TO RELATED APPLICATION

This application claims priority to Korean Patent Application No. 10-2013-0159622 filed on Dec. 19, 2013, the entire disclosure of which is hereby incorporated by reference herein in its entirety.

TECHNICAL FIELD

The present disclosure relates to a liquid crystal display.

DISCUSSION OF THE RELATED ART

A liquid crystal display (LCD) is currently one of the most widely used flat panel displays, and is a device which generates an electric field by applying different potentials to a pixel electrode and a common electrode of a liquid crystal display panel so as to change an orientation of liquid crystal molecules and control light transmittance based on the changed orientation of the liquid crystal molecules, thereby displaying an image.

The liquid crystal display panel of the liquid crystal display is a non-emissive element, so it has a backlight unit for providing light to the liquid crystal display panel from, for example, a rear side of the liquid crystal display panel.

For example, the liquid crystal display uses a bottom chassis to support a backlight assembly, has a liquid crystal display panel installed over the backlight assembly, and uses a top chassis to combine the liquid crystal display panel and the backlight assembly. In this instance, the top chassis wraps a rim of the liquid crystal display panel.

Recently, demands for slim liquid crystal displays have been increased. Also, it is considered to be excellent from a technical and a designing standpoint to narrow a bezel for a liquid crystal display panel.

A part of the substrate on which an attached region is not provided from among two facing substrates is removed from a part of an edge on which a region to which a driving connection line for transmitting signals to the liquid crystal display panel is provided from among four edges of the liquid crystal display panel, and the attached region is exposed. Therefore, the exposed region must be covered by using a chassis.

SUMMARY

Exemplary embodiments of the present invention provide a liquid crystal display on which a liquid crystal display panel is substantially visible while no bezel is provided on any edges of the liquid crystal display panel.

Exemplary embodiments of the present invention also reduce reflectance of a liquid crystal display panel.

An exemplary embodiment of the present invention provides a liquid crystal display including: a bottom chassis, a backlight assembly received in the bottom chassis, a liquid crystal display panel including a thin film transistor substrate and a counter substrate disposed opposite to the thin film transistor substrate, with the liquid crystal display panel being disposed so that the counter substrate faces the backlight assembly. The liquid crystal display further includes a mold structure disposed between the bottom chassis and the liquid crystal display panel and which is configured to fasten the liquid crystal display panel to the bottom chassis, a driving connection line connected to the thin film transistor substrate, and a shield case configured to cover the driving connection line to protect the driving connection line, and including a lateral side disposed corresponding to an edge of the liquid crystal display panel or disposed inside the edge of the liquid crystal panel.

The driving connection line may be a flexible printed circuit board which has a first terminal attached to a lower side of the thin film transistor substrate and a second terminal attached to a printed circuit board disposed on a lower side of the bottom chassis.

The mold structure may include an upper mold and a lower mold, with the upper mold and the lower mold respectively including a horizontal portion and a vertical portion, and a lower side of the liquid crystal display panel is fixed to an upper side of the horizontal portion of the upper mold.

The liquid crystal display panel may be attached to the upper mold through an adhesive member.

A protrusion may be disposed on one of the horizontal portion of the upper mold and the horizontal portion of the lower mold, and a groove or hole corresponding to the protrusion is disposed on the other of the horizontal portion of the upper mold and the horizontal portion of the lower mold.

The vertical portion of the upper mold and the vertical portion of the lower mold may be alternately fixed to a lateral side of the bottom chassis.

The vertical portion of the upper mold and the vertical portion of the lower mold may be fastened to a hook disposed on the lateral side of the bottom chassis.

The vertical portion of the lower mold may be fixed to a lateral side of the bottom chassis and the horizontal portion of the upper mold is fixed to a lateral side of the lower mold.

The vertical portion of the upper mold and the vertical portion of the lower mold may be extended downward to a bottom of a lateral wall of the bottom chassis.

The vertical portion of the upper mold and the vertical portion of the lower mold may not extend substantially downward at a position through which the driving connection line passes.

A light blocking member may be disposed on an external side of the thin film transistor substrate.

The light blocking member may be disposed on the external side of the thin film transistor substrate so as to cover a part that includes a light reflecting material disposed inside the thin film transistor substrate.

The part including the light reflecting material may include a thin film transistor, a gate line, and a data line.

The light blocking member may be disposed on a surface of the thin film transistor substrate so as to cover the thin film transistor, the gate line, the data line, and a non-display area of the liquid crystal display panel.

A black matrix may be formed on the thin film transistor substrate of the liquid crystal display panel.

The thin film transistor of the thin film transistor substrate may include a low-reflection metal.

The liquid crystal display may further include a low-reflection polarizer disposed on an upper side of the thin film transistor substrate.

The liquid crystal display may further include a polarizer disposed on an upper side of the thin film transistor substrate, and including at least one edge coated with a light blocking material.

The liquid crystal display may further include a polarizer disposed on an upper side of the thin film transistor substrate, and including an edge on which a logo is printed.

The mold structure may have an opening disposed in a position that substantially corresponds to the logo.

The liquid crystal display may further include a touch sensor panel disposed on the liquid crystal display panel.

The shield case may include a lateral side that corresponds to an edge of the touch sensor panel or that is disposed on an inner side of the touch sensor panel.

In accordance with an exemplary embodiment, a liquid crystal display is provided. The liquid crystal display includes a bottom chassis, a backlight assembly received in the bottom chassis, a liquid crystal display panel including a thin film transistor substrate and a counter substrate disposed opposite to the thin film transistor substrate with the liquid crystal display panel being disposed so that the counter substrate faces the backlight assembly. The counter substrate is shorter than the thin film transistor substrate on at least one edge of the liquid crystal display panel such that a step is defined between the counter substrate and the thin film transistor substrate and at least one edge of the thin film transistor substrate is exposed by the counter substrate.

In addition, the liquid crystal display further includes a mold structure, disposed between the bottom chassis and the liquid crystal display panel, and is configured to fasten the liquid crystal display panel to the bottom chassis, a driving connection line including a driving circuit disposed thereon which is configured to drive the liquid crystal display panel, and in which a first terminal of the driving connection line is connected to an attaching region disposed on the at least one edge of the thin film transistor substrate of the liquid crystal panel exposed by the counter substrate of the liquid crystal display panel and in which a second terminal of the driving connection line is connected to a printed circuit board disposed on a bottom side of the bottom chassis. The driving circuit of the driving connection line is disposed facing the bottom side of the bottom chassis.

Also, the liquid crystal display further includes a shield case configured to cover the driving connection line to protect the driving connection line, and including a horizontal portion substantially parallel to a bottom side of the bottom chassis and a vertical portion upwardly extending from the horizontal portion and in which the vertical portion of the shield case is not visible in a viewpoint of a front of the liquid crystal display panel.

According to exemplary embodiments of the present invention, it is not necessary to cover all edges of the liquid crystal display panel using a chassis, etc., and therefore, substantially no bezel exists and only the liquid crystal display panel is visible in the front of the liquid crystal display.

Thin film transistors and wirings in the thin film transistor substrate facing the front of the liquid crystal display are covered by the light blocking member, thereby preventing light reflection by a metal material.

BRIEF DESCRIPTION OF THE DRAWINGS

Exemplary embodiments of the present invention can be understood in more detail from the following detailed description taken in conjunction with the attached drawings in which.

DETAILED DESCRIPTION OF EXEMPLARY EMBODIMENTS

Figure 1:
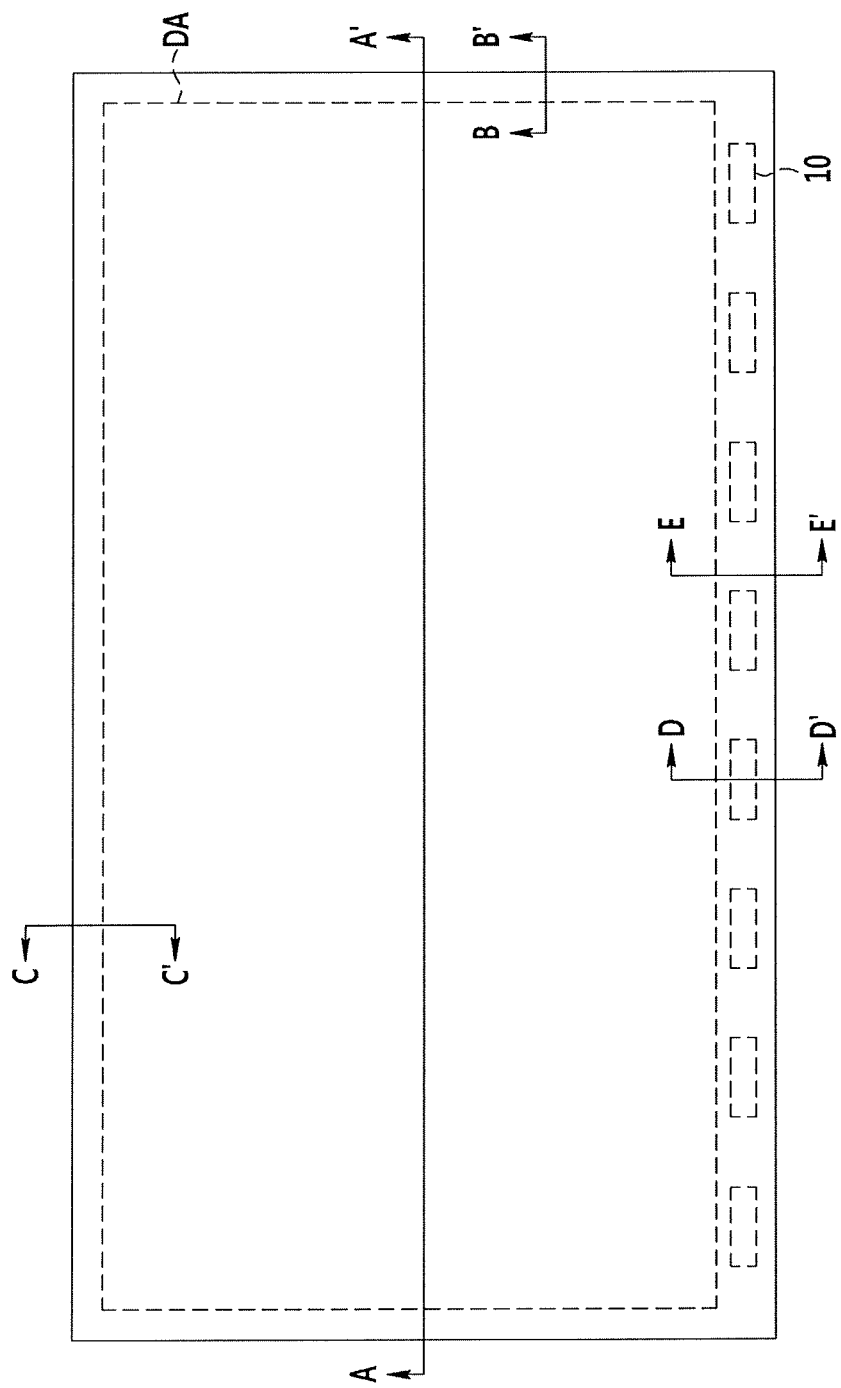
FIG. 1 shows a layout view of a liquid crystal display according to an exemplary embodiment of the present invention.

Exemplary embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

A liquid crystal display according to an exemplary embodiment of the present invention will now be described with reference to accompanying drawings.

Figure 2:
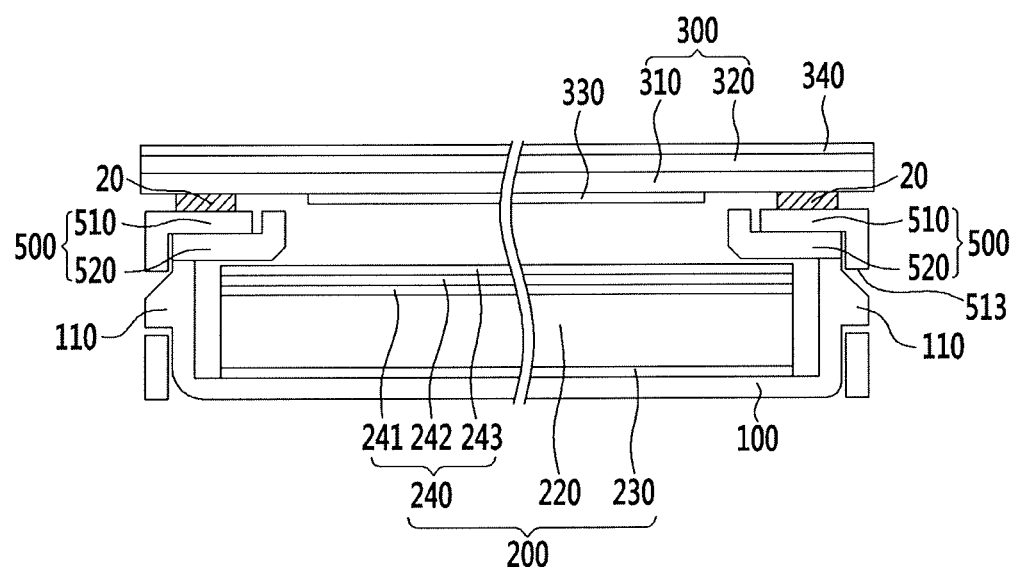
FIG. 2 shows a cross-sectional view of a liquid crystal display of FIG. 1 with respect to a line A-A'.
Figure 3:
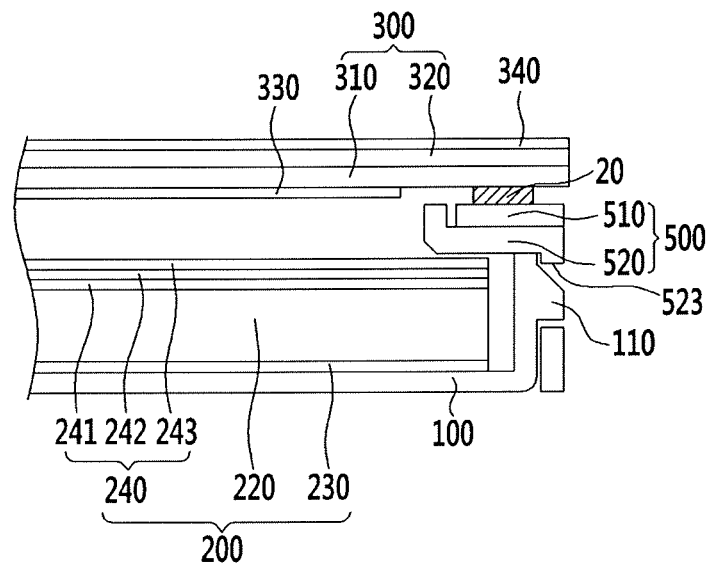
FIG. 3 shows a cross-sectional view of a liquid crystal display of FIG. 1 with respect to a line B-B'.
Figure 4:
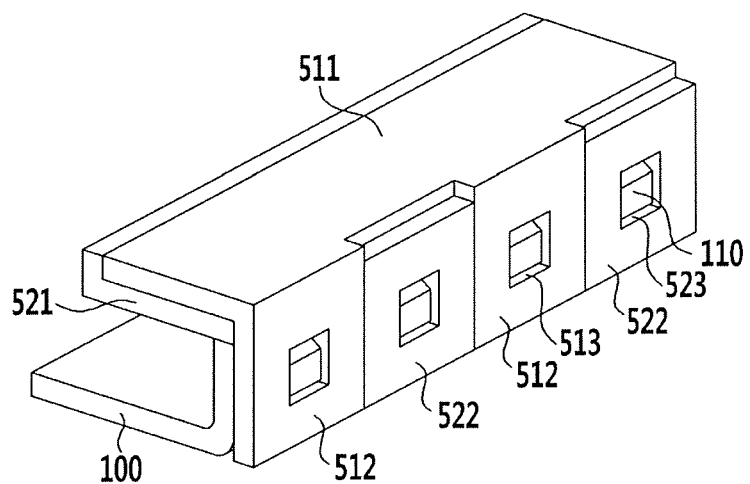
FIG. 4 shows a partial perspective view for indicating a combination relationship among a bottom chassis, a top mold, and a mold in the liquid crystal display of FIG. 1.
Figure 5:
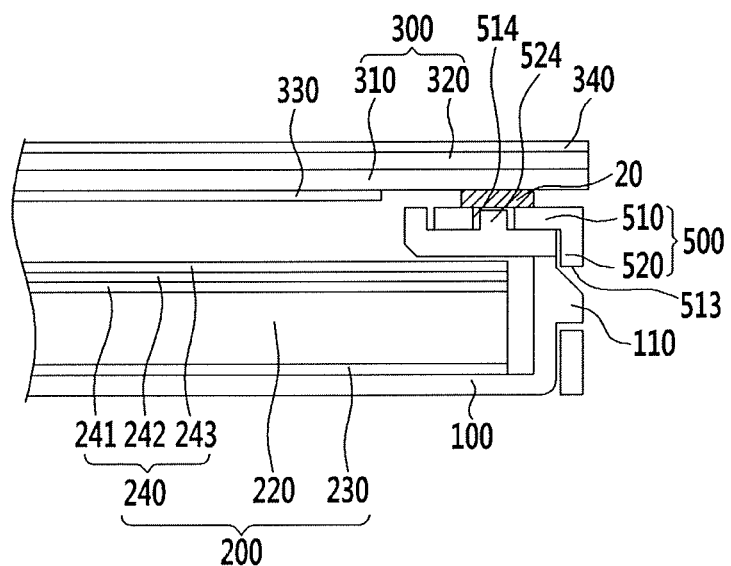
FIG. 5 shows an exemplary variation of a cross-section shown in FIG. 2 and FIG. 3.
Figure 6:
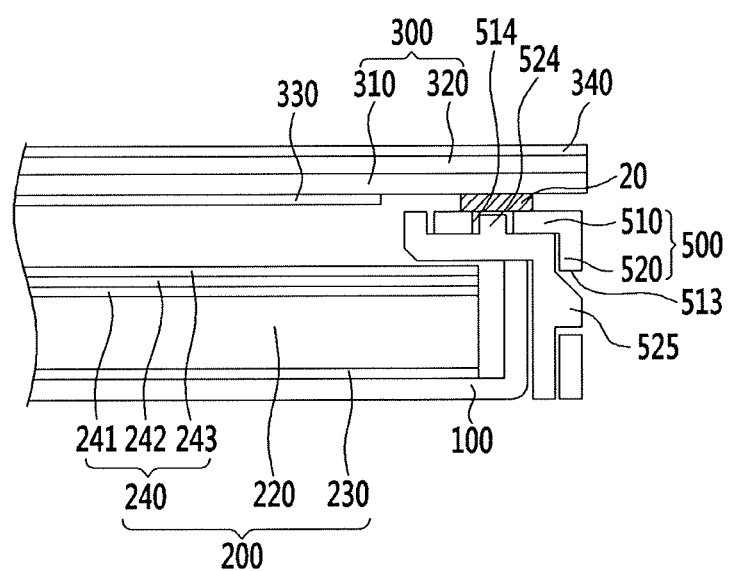
FIG. 6 shows an exemplary variation of a cross-section shown in FIG. 2 and FIG. 3.
Figure 7:
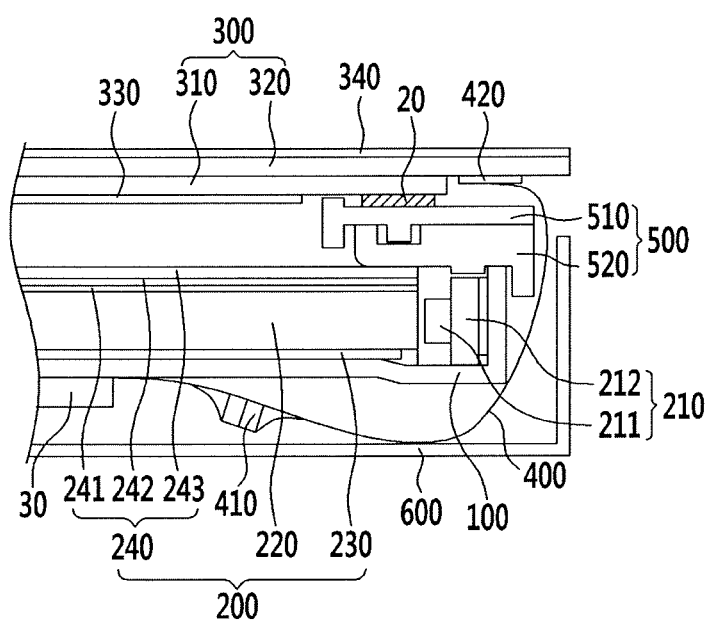
FIG. 7 shows a cross-sectional view of the liquid crystal display of FIG. 1 with respect to a line D-D'.
Figure 8:
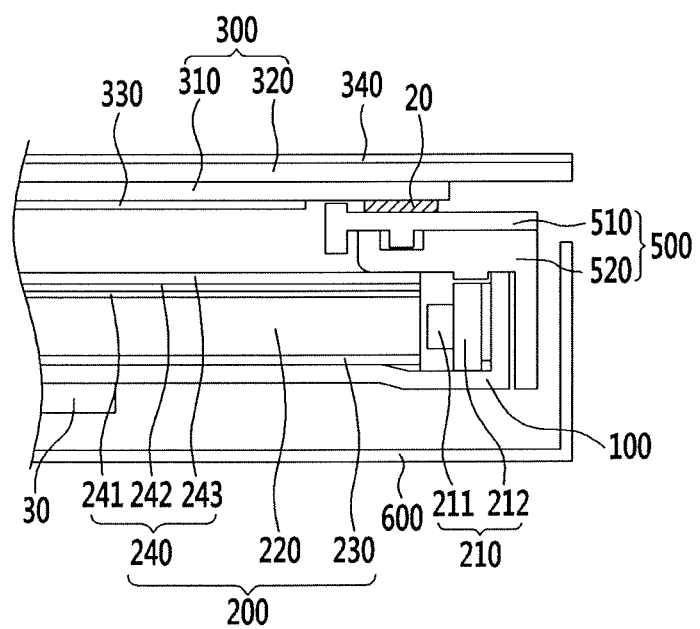
FIG. 8 shows a cross-sectional view of the liquid crystal display of FIG. 1 with respect to a line E-E'.

FIG. 1 shows a layout view of a liquid crystal display according to an exemplary embodiment of the present invention, FIG. 2 shows a cross-sectional view of a liquid crystal display of FIG. 1 with respect to a line A-A', FIG. 3 shows a cross-sectional view of a liquid crystal display of FIG. 1 with respect to a line B-B', FIG. 4 shows a partial perspective view for indicating a combination relationship among a bottom chassis, a top mold, and a mold in a liquid crystal display of FIG. 1, FIG. 7 shows a cross-sectional view of a liquid crystal display of FIG. 1 with respect to a line D-D', and FIG. 8 shows a cross-sectional view of a liquid crystal display of FIG. 1 with respect to a line E-E'. FIG. 5 and FIG. 6 show exemplary variations of a cross-sectional shown in FIG. 2 and FIG. 3.

Referring to FIG. 1, the liquid crystal display panel of the liquid crystal display according to an exemplary embodiment of the present invention is schematically shown. Entire structures of the liquid crystal display are disposed below (or in a rear side thereof when it is set to stand) the liquid crystal display panel so they are not seen because they are hidden by the liquid crystal display panel from the viewpoint of the front side. In FIG. 1, a region defined by a large rectangle indicated with dotted lines represents a display area (DA) for displaying an actual image when a plurality of pixels are formed and the liquid crystal display is turned on, and an edge outside it represents a non-display area in which the image is not displayed.

A region defined by a plurality of rectangles shown with dotted lines at the bottom of FIG. 1 represents a part that is provided inside the liquid crystal display and is not seen from the outside, and it is an attaching region 10 to which a pad of a driving connection line for transmitting a driving signal to the liquid crystal display panel is attached.

FIG. 2 shows a cross-section of the liquid crystal display along a line A-A' of FIG. 1 in a horizontal direction, and FIG. 7 shows a cross-section of an lower edge on which the attaching region 10 is provided along a line D-D' of FIG. 1 in the liquid crystal display.

The liquid crystal display includes a bottom chassis 100, a backlight assembly 200 received in the bottom chassis 100, a liquid crystal display panel 300 provided on an upper side of the backlight assembly 200, and a mold structure 500 provided between the bottom chassis 100 and the liquid crystal display panel 300.

The bottom chassis 100 is formed to be, for example, a substantially cuboidal box of which an upper part is opened, and it has a receiving space with a predetermined depth inside it. That is, the bottom chassis 100 includes, for example, a chassis bottom side and a side wall upwardly extended from four edges of the chassis bottom side. The backlight assembly 200 for providing light to the liquid crystal display panel 300 is received in the receiving space.

The backlight assembly 200 may include, for example, a light source 210 for generating light, a light guide 220 having an edge that is adjacent to the light source 210, a reflection sheet 230 provided on a lower side of the light guide 220, and a plurality of optical sheets 240 provided to an upper side of the light guide 220.

The light source 210, as a light source, includes, for example, a light emitting diode (LED) package 211 and a substrate 212 on which the light emitting diode (LED) package 211 is installed. The substrate 212 supplies external power to the light emitting diode (LED) package 211. Light emitted by the light source 210 is provided to a lateral side of the light guide 220, and is output to an upper side and a lower side through the light guide 220.

The light source 210 has been shown to be provided, for example, on one side of the light guide 220 in the drawing, but exemplary embodiments of the present invention are not limited thereto. Rather, alternatively, the light source 210 may be provided to, for example, another side thereof opposite to the one side or at four edges thereof.

The light emitting diode (LED) package 211 has been exemplified as a light source in the present exemplary embodiment, in which, a cold cathode fluorescent lamp (CCFL) may be used as a light source but exemplary embodiments of the present invention are not limited thereto. For example, alternatively, in an exemplary embodiment, an external electrode fluorescent lamp (EEFL), a flat fluorescent lamp (FFL), a light emitting diode (LED), an electro luminescence (EL), or a hot cathode fluorescent lamp (HCFL) may be used as a light source. Further, the light source 210 has been shown to be an edge type provided to the lateral side of the light guide 220, and a direct type for providing light from the lower part of the light guide 220 may be applicable.

The light guide 220 may be formed with, for example, a polymethylmethacrylate (PMMA) material with excellent light transmittance or a methylstyrene (MS) material with excellent heat and humidity resistance. Moreover, the light guide 220 may also be formed of other materials such as, for example, a polyethylene terephthalate (PET) resin, a polycarbonate (PC) resin, a cyclic olefin copolymer (COC) resin, or a polyethylene naphthalate (PEN) resin. The light guide 220 transforms the light that has an optical distribution in a spot light source or a linear light source form generated by the light source 210 into light that has an optical distribution in a surface light source form, such that the light guide 220 distributes light in a flat manner. A wedge-type plate or a flat plate may be used for the light guide 220, and a pattern may be formed on either side or both sides thereof.

The reflection sheet 230 provided to a lower side of the light guide 220 is provided to reflect the light progressing to the lower side of the light guide 220, and a sheet (or a plate) having predetermined light reflectance is used.

The optical sheet 240 provided to an upper side of the light guide 220 may include, for example, a diffusion sheet 241, a prism sheet 242, and a reflection polarizing sheet 243. The diffusion sheet 241 diffuses the light output by the light guide 220 to control luminance distribution to be uniform. The prism sheet 242 controls a progression direction of the light diffused by the diffusion sheet 241 to allow the light to proceed in a perpendicular direction with respect to the liquid crystal display panel 300. The reflection polarizing sheet 243 may be used to increase the luminance efficiency of the liquid crystal display.

For example, in an embodiment, the optical sheet 240 may not include some of the diffusion sheet 241, the prism sheet 242, and the reflection polarizing sheet 243, may include multiple sheets from among them, and may further include an optical sheet or a protecting sheet having other characteristics.

The liquid crystal display panel 300 for displaying an image is provided on the upper side of the backlight assembly 200, and the mold structure 500 for fastening the backlight assembly 200 and the liquid crystal display panel 300 is provided between them. The liquid crystal display panel 300 includes, for example, a first substrate 310 and a second substrate 320 that face each other and that are made of a transparent insulator such as glass, quartz or plastic. Further, in an example embodiment, the transparent insulator substrate may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or a combination thereof.

A common electrode made of, for example, a transparent conductor such as indium tin oxide (ITO), indium zinc oxide (IZO), aluminum doped ZnO (AZO), cadmium zinc oxide (CZO), indium gallium zinc oxide (IGZO), or a combination thereof may be formed on one side (e.g., a side that faces the second substrate 320) of the first substrate 310 of the liquid crystal display panel 300. A color filter (CF) may be formed on the first substrate 310 which may be called a color filter substrate.

A thin film transistor (TFT) and a pixel electrode are formed on the second substrate 320 on a side that faces the first substrate 310. The pixel electrode may be made of, for example, a transparent conductor such as indium tin oxide (ITO), indium zinc oxide (IZO), aluminum doped ZnO (AZO), cadmium zinc oxide (CZO), indium gallium zinc oxide (IGZO), or a combination thereof.

A source terminal of the thin film transistor is connected to a data line, a gate terminal is connected to a gate line, and a drain terminal is connected to a pixel electrode. In general, the second substrate 320 is referred to as a thin film transistor substrate. For example, a color filter in addition to the thin film transistor may be formed on the second substrate, and a common electrode may be formed thereon. In this case, a color filter and/or a common electrode may not be provided on the first substrate 310.

The first substrate 310 is assembled with the second substrate 320 with a predetermined gap therebetween, and a liquid crystal material is filled in the gap by, for example, dripping or injection. When an electrical signal is applied to a gate line and a source line of the thin film transistor of the second substrate 320 and the thin film transistor is turned on, an electric field is formed between the pixel electrode and the common electrode. An arrangement of liquid crystal molecules between the first substrate 310 and the second substrate 330 is changed by the electric field, light transmittance is changed by the changed arrangement, and a desired image is displayed. The liquid crystal display panel 300 may further include, for example, polarizers 330 and 340 on the lower side of the first substrate 310 and the upper side of the second substrate 320, respectively. The polarizers 330 and 340 polarize the light input to the liquid crystal display panel 300.

The first substrate 310 is formed to be shorter than the second substrate 320 on at least one edge in order to expose the attaching region 10 of the driving connection line of the second substrate 320 that is a thin film transistor substrate of the liquid crystal display panel 300.

The present exemplary embodiment has described the structure in which the attaching region 10 to which a driving connection line 400 is attached on the bottom edge of the liquid crystal display panel 300, but exemplary embodiments are not limited thereto. For example, alternatively, in an exemplary embodiment, the liquid crystal display panel 300 may also have a structure in which the attaching region 10 is exposed on the upper edge, the left edge, and/or the right edge together with or except the bottom edge.

As shown in FIG. 7, the first substrate 310 is formed to be shorter than the second substrate 320 on the bottom edge of the liquid crystal display panel 300 so a step is provided between the substrates 310 and 320. However, when a user actually sees the front of the liquid crystal display panel 300 after completion of the product, the upper side of the second substrate 320 that is flat and smooth is exposed.

The driving connection line 400 in which a driving circuit 410 such as, for example, a driving IC for driving the liquid crystal display panel 300 is installed is connected to the attaching region 10 formed on the lower side on the bottom edge of the second substrate 320. For the above-noted connection, an adhesive pad 420 may be formed on a first terminal of the driving connection line 400 and may be attached to the attaching region 10.

The driving circuit 410 generates a data driving signal and/or a gate driving signal for driving the liquid crystal display panel 300, and the driving signal is applied to the data line and the gate line provided to the second substrate 320 of the liquid crystal display panel 300 through the driving connection line 400.

As shown in FIG. 7, when the driving circuit 410 is installed to face the opposite side of the bottom chassis 100, electromagnetic interference (EMI) that may occur by a contact between the bottom chassis 100 and the driving circuit 410 may be controlled. A single or multiple driving circuits 410 may be installed therein.

A second terminal of the driving connection line 400 is connected to a printed circuit board (PCB) 30 for supplying an external signal, and the printed circuit board (PCB) 30 is generally provided on the bottom side of the bottom chassis 100. The driving connection line 400 may be, for example, a flexible printed circuit board (FPC), and it can be called a chip on film (COF) as the driving circuit 410 is installed thereon.

As shown in FIG. 1, multiple attaching regions 10 formed on the second substrate of the liquid crystal display panel may be formed near a bottom edge at regular intervals so the driving connection line 400 may be provided at a number that corresponds to the number of attaching regions 10.

A film for a relatively easy adhesive purpose may be provided between the attaching region 10 of the second substrate 320 and the adhesive pad 420 of the driving connection line 400. An anisotropic conductive film may be used for the above-noted film, and it has a form in which conductive particles are included in a thermosetting resin film. The adhesive pad 420 of the driving connection line 400 may be bonded and attached to the attaching region 10 of the second substrate 320 by, for example, an outer lead bonding (OLB) process.

As the adhesive pad 420 of the first terminal of the driving connection line 400 is adhered to the lower side of the second substrate 320 and the second terminal is connected to the printed circuit board (PCB) 30 provided to the lower side of the bottom chassis 100, the driving connection line 400 is bent to surround a lateral side of the mold structure 500, a lateral side of the bottom chassis 100, and a part of a lower side of the bottom chassis 100, as shown in FIG. 7. To protect the bent driving connection line 400 from being damaged, a shield cover 600 may be provided to substantially wrap the driving connection line 400.

The shield cover 600 may include, for example, a horizontal portion that is substantially parallel to the bottom side of the bottom chassis 100 and a vertical portion upwardly extended from a first terminal of the horizontal portion. The shield cover 600 is installed so that the vertical portion may not digress from the edge of the liquid crystal display panel 300. That is, the shield cover 600 may be installed to be inside a virtual perpendicularly-extended line on the edge of the liquid crystal display panel 300. This is because, when the vertical portion digresses from the edge of the liquid crystal display panel 300 and at least a part of the vertical portion is visible in the viewpoint of the front of the liquid crystal display panel 300, a bezel such as, for example, a saw chassis for covering it may be needed.

The mold structure 500 is disposed between the liquid crystal display panel and the backlight assembly 200 and fastens the liquid crystal display panel 300 to the backlight assembly 200. The mold structure 500 has, for example, a substantially cuboidal square frame of which the upper part and the lower part are opened. The mold structure 500 includes, for example, an upper mold 510 and a lower mold 520, and the dual-mold structure eases replacement of one of the liquid crystal display panel 300 and the backlight assembly 200. The upper mold 510 and the lower mold 520 include, for example, horizontal portions 511 and 521 that are substantially parallel to the liquid crystal display panel 300, and vertical portion 512 and 522 that are substantially perpendicular to the liquid crystal display panel 300.

For example, referring to FIG. 2 to FIG. 4, the horizontal portion 511 of the upper mold 510 is provided to contact the upper side of the horizontal portion 521 of the lower mold 520. The liquid crystal display panel 300 is attached to the upper side of the horizontal portion 511 of the upper mold 510 through, for example, an adhesive member 20. The adhesive member 20 may be, for example, a double-sided cushioned adhesive tape having a shock-absorbing function. The lower side of the first substrate 310 is attached to the liquid crystal display panel 300 of the adhesive member 20.

Regarding the upper mold 510 and the lower mold 520, the lower side of the horizontal portion 511 of the upper mold 510 is provided to contact the upper side of the horizontal portion 521 of the lower mold 520, and the vertical portions 512 and 522 of the upper mold 510 and the lower mold 520, respectively may be formed to be alternately provided. In other words, the horizontal portion 511 of the upper mold 510 and the horizontal portion 521 of the lower mold 520 are continuously formed in one direction, and when they are combined, the horizontal portion 511 of the upper mold 510 is provided over the horizontal portion 521 of the lower mold 520. However, as the vertical portion 512 of the upper mold 510 and the vertical portion 522 of the lower mold 520 are formed at regular intervals rather than being continuously formed, and in one direction (e.g., parts in which vertical portions 512 and 522 are formed and parts in which the same are not formed are regularly provided in the upper mold 510 and the lower mold 520), when the upper mold 510 is combined to the lower mold 520, their vertical portions 512 and 522 are alternately provided to configure one continuous surface. The above mold structure is shown in FIG. 4, and this mold structure may be beneficial for fastening the upper mold 510 and the lower mold 520 to a plurality of hooks 110 formed on a side wall of the bottom chassis 100.

Regarding the fastening of the upper mold 510 and the lower mold 520 to the hooks 110 of the bottom chassis 100, FIG. 2 shows a cross-sectional view in a section in which the vertical portion 512 of the upper mold 510 is formed and in which the vertical portion 522 of the lower mold 520 is not provided, and FIG. 3 shows a cross-sectional view in a section in which the vertical portion 522 of the lower mold 520 is formed and in which the vertical portion 512 of the upper mold 510 is not provided.

In the section shown in FIG. 2, the upper mold 510 is fastened to the hook 110. For the above-noted fastening, a hole 513 is formed in a position that corresponds to the hook 110 on the vertical portion of the upper mold 510. In the section shown in FIG. 3, the lower mold 520 is fastened to the hook 110, and for the noted fastening, a hole 523 is formed in a position that corresponds to the hook 110 on the vertical portion 522 of the lower mold 520.

According to the above-noted manner, the vertical portion 512 of the upper mold 510 and the vertical portion 522 of the lower mold 520 are alternately fastened to a plurality of hooks 110 formed on a side wall of the bottom chassis 100, and the fastening may be applicable to another side wall of the bottom chassis 100 in a like manner.

An internal end of the horizontal portion 521 of the lower mold 520 may be formed, for example, to be bent upward at a point where it meets an internal end of the horizontal portion 511 of the upper mold 510. On the contrary, an internal end of the horizontal portion 511 of the upper mold 510 may be formed to be bent downward at a point where it meets an internal end of the horizontal portion 521 of the lower mold 520. The formation of the bend of the internal end of the horizontal portions 511, 521 may restrict relative movement between the upper mold 510 and the lower mold 520.

FIG. 5 shows an exemplary variation of a structure shown in FIG. 2 and FIG. 3 with reference to the structure of the upper mold 510 and the lower mold 520. In the case of FIG. 2 and FIG. 3, the surface of the upper mold 510 contacts the surface of the lower mold 520, while in the case of FIG. 5, a protrusion 524 is formed on the upper side of the horizontal portion 521 of the lower mold 520, and a hole 514 is formed at a position that corresponds to the protrusion 524 in the horizontal portion 511 of the upper mold 510. By forming a structure with protrusions and depressions at the corresponding positions, when the upper mold 510 to which the liquid crystal display panel 300 is attached is assembled to the lower mold 520, the hole 514 of the upper mold 510 may fit the protrusion 524 of the lower mold 520 thereby achieving assembling, arrangement, and design stability of the liquid crystal display panel 300.

When the above-described fastening structure is formed on the upper mold 510 and the lower mold 520, widths of the upper mold 510 and the lower mold 520 are increased and a width of the non-display area on the edge of the liquid crystal display panel 300 may be resultantly increased. The fastening structure may be applied to at least one edge of the mold structure 500.

Although it is shown in the drawing that the protrusion 524 is formed on the lower mold 520 and the hole 514 is formed in the upper mold 510, it is noted that exemplary embodiments of the present invention are not limited thereto. For example, in exemplary embodiment, it is also possible to have variations in which a protrusion is formed on the upper mold 510 and a hole is formed in the lower mold 520, a protrusion is formed on the upper mold 510 and a hole is formed on the lower mold 520, or a hole is formed in the upper mold 510 and a protrusion is formed on the lower mold 520.

FIG. 6 shows an additional exemplary variation that is different from those that are described with reference to FIG. 2 and FIG. 3 regarding the structure of the upper mold 510 and the lower mold 520. In the present exemplary embodiment, respective horizontal portions and vertical portions of the upper mold 510 and the lower mold 520 are continuously formed. That is, the vertical portion of the upper mold 510 is not formed to be alternately provided to the vertical portion of the lower mold 520, but the vertical portion of the upper mold 510 is formed to cover the vertical portion of the lower mold 520. Therefore, an external side of the lower mold 520 contacts an internal side of the upper mold 510.

When having the above-described mold structure, the lower mold 520 is fastened to the hook 110 formed on the bottom chassis 100 as shown in FIG. 3, and the upper mold 510 may be fastened to a hook 525 formed on the vertical portion of the lower mold 520 through the hole 513 formed in the vertical portion as shown in FIG. 6.

In addition, a structure of a cross-section with respect to a line C-C' in FIG. 1, that is, a cross-section of the edge of the upper part of the liquid crystal display panel 300, may correspond to the structure of one of the cross-sections shown in FIG. 2 to FIG. 6. In other words, the cross-section of the edge of the upper part of the liquid crystal display panel 300 may have a structure of the cross-section of the edge of the right/left edges of the exemplified liquid crystal display panel 300. However, the structure of the cross-section on the edge of the upper part is not needed to correspond to the structure of the cross-section of the edge of the left/right edges. For example, regarding a single liquid crystal display, the edge of the upper part may have a cross-sectional structure of FIG. 3, and the left/right edges may have a cross-sectional structure of FIG. 6.

FIG. 7 shows a section in which an attaching region 10 of the liquid crystal display panel to which a driving connection line 400 such as, for example, a COF, is connected is provided at a bottom edge of the liquid crystal display shown in FIG. 1, and FIG. 8 shows a section to which the attaching region 10 is not provided (therefore, the driving connection line 400 is not connected thereto) at the bottom edge thereof.

Referring to FIG. 7, vertical portions of the upper and lower molds 510 and 520 may not be substantially provided so that the driving connection line 400 may be bent and connected without interference. In a section in which the driving connection line 400 is not connected as shown in FIG. 8, the vertical portions of the upper and lower molds 510 and 520 may be formed to extend substantially to the lower side of the bottom chassis 100 so that they may be fastened to the bottom chassis 100 as described above with reference to FIG. 2 to FIG. 6.

When the light source 210 and the attaching region 10 are provided on the bottom edge, an additional space may be needed compared to the top or left/right edges and a width of the non-display area on the edge of the liquid crystal display panel is increased. Further, when the driving connection line 400 that is a COF is inversely bent as shown in FIG. 7, an additional space may be required so that it may be bent and may not be protruded outside the shield cover 600.

Figure 9:
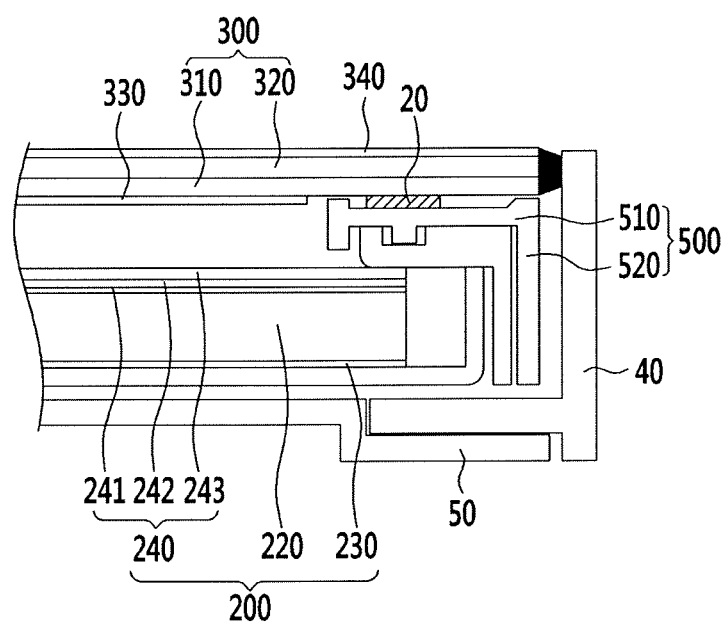
FIG. 9 shows a cross-sectional view of right, left and/or top edges when a set case is applied to the liquid crystal display of FIG. 1.
Figure 10:
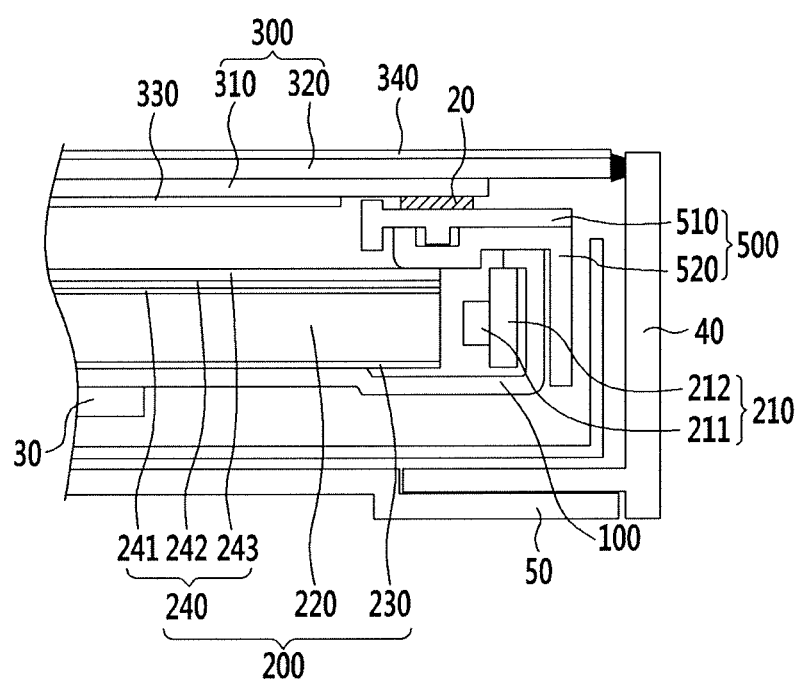
FIG. 10 shows a cross-sectional view of a bottom edge when a set case is applied to the liquid crystal display of FIG. 1.

FIG. 9 shows a cross-sectional view of right, left and/or top edges when a set case is applied to the liquid crystal display of FIG. 1, and FIG. 10 shows a cross-sectional view of a bottom edge when a set case is applied to the liquid crystal display of FIG. 1. The set case may include, for example, a lateral set case 40 and a rear set case 50, and the lateral set case 40 wraps four edges of the liquid crystal display panel 300. The lateral set case 40 may be less than about 2 mm thick, and may be less than about 1 mm thick if appropriate rigidity is ensured.

The first substrate 310 and the second substrate 320 are bonded to the lateral set case 40 by a bonding means such as, for example, silicone on the right, left, and upper edges of the liquid crystal display panel 300, and the second substrate 320 is bonded to the lateral set case 40 on the bottom edge as the first substrate 310 is shorter than the second substrate 320. A chassis for covering the upper side of the liquid crystal display panel 300 may be removed from the bottom edge as well as the right, left, and upper edges so the bezel is not substantially provided.

According to the present exemplary embodiment, as the second substrate 320 of the liquid crystal display panel 300 faces the outside, light reflection caused by a metal that forms the thin film transistor, the gate line, and the data line may be a difficulty. An exemplary embodiment for preventing or weakening light reflection will now be described. The same constituent elements as in the above-described exemplary embodiment will have the same reference numerals, the same characteristics will be briefly described or omitted, and different characteristics will be described in detail.

Figure 11:
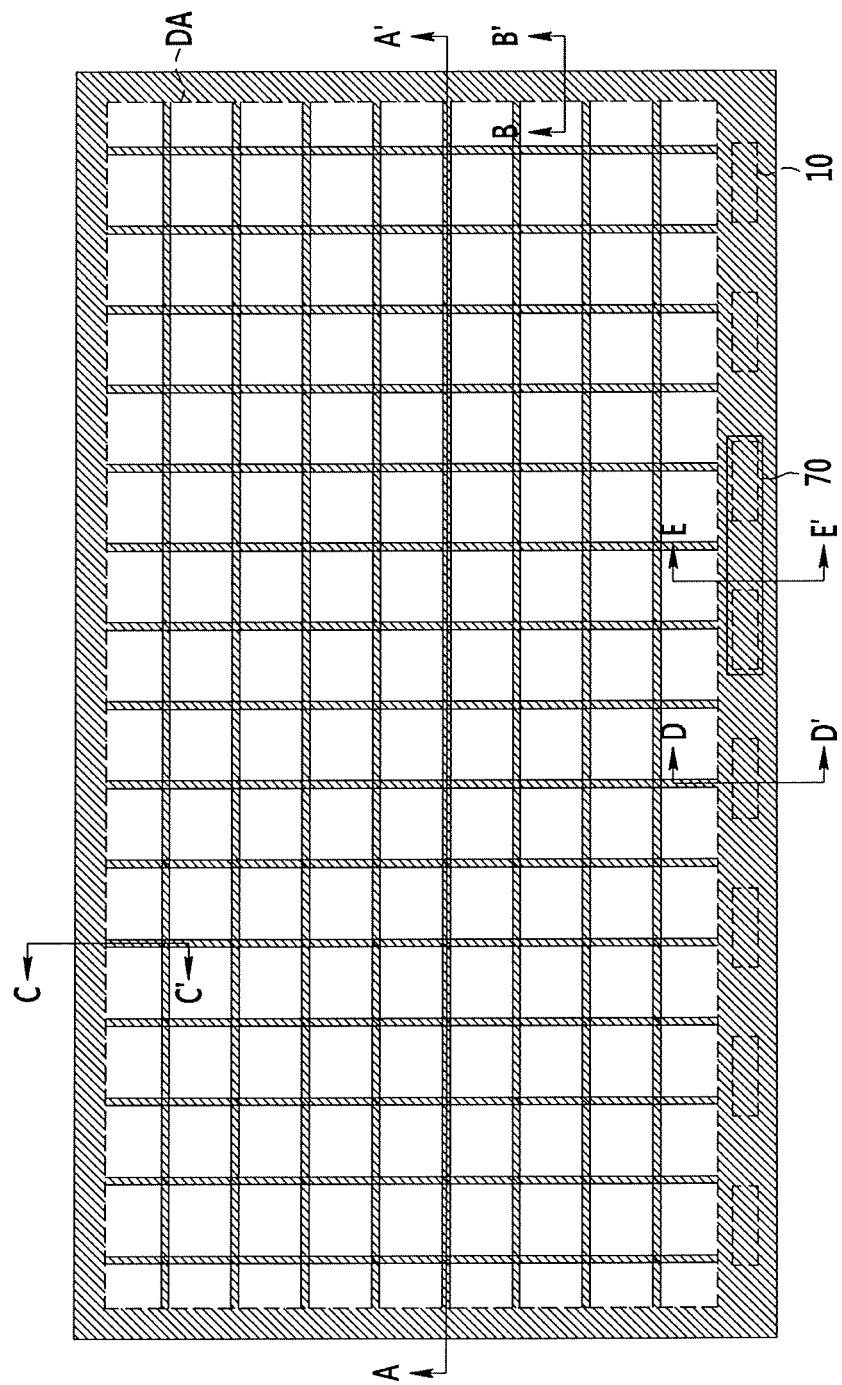
FIG. 11 shows a layout view of a liquid crystal display according to an exemplary embodiment of the present invention.
Figure 12:
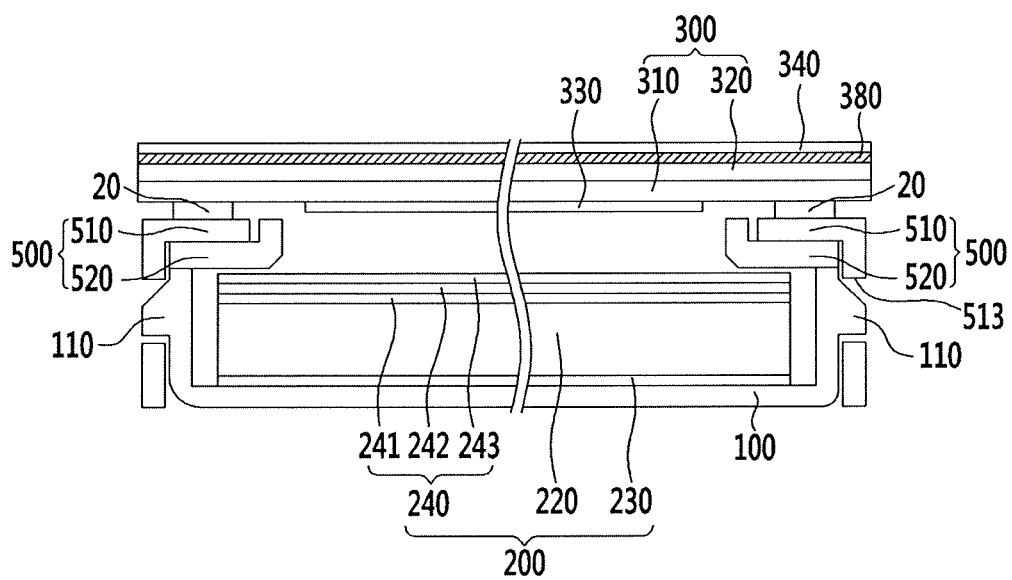
FIG. 12 shows a cross-sectional view of the liquid crystal display of FIG. 11 with respect to a line A-A'.
Figure 13:
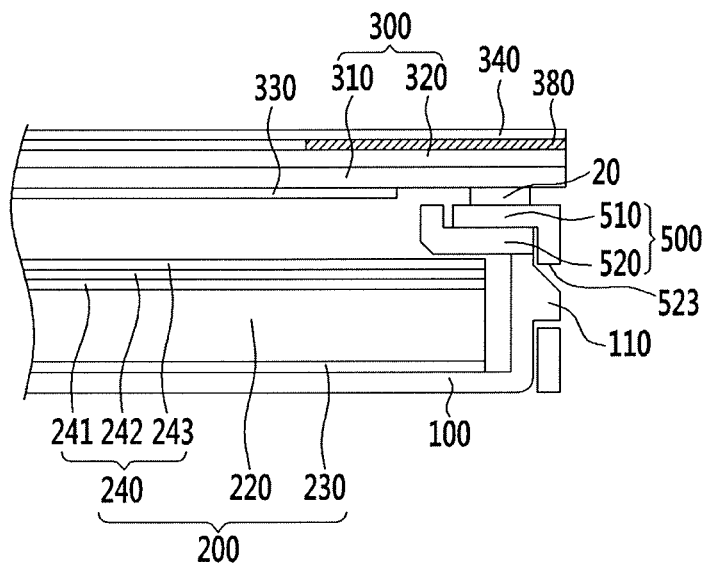
FIG. 13 shows a cross-sectional view of the liquid crystal display of FIG. 11 with respect to a line B-B'.
Figure 14:
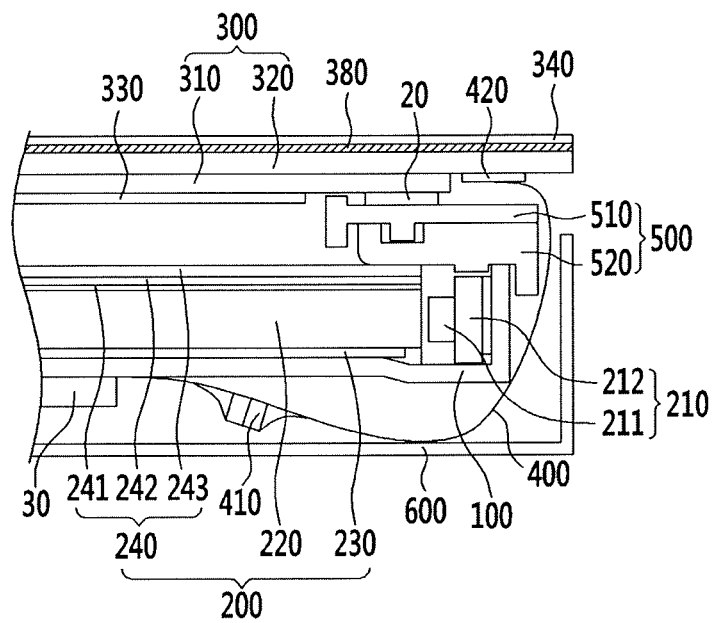
FIG. 14 shows a cross-sectional view of the liquid crystal display of FIG. 11 with respect to a line D-D'.

FIG. 11 shows a layout view of a liquid crystal display according to an exemplary embodiment of the present invention, FIG. 12 shows a cross-sectional view of a liquid crystal display of FIG. 11 with respect to a line A-A', FIG. 13 shows a cross-sectional view of a liquid crystal display of FIG. 11 with respect to a line B-B', and FIG. 14 shows a cross-sectional view of a liquid crystal display of FIG. 11 with respect to a line D-D'.

In the drawings, a part indicated by oblique lines represents a light blocking member (frequently called a black matrix) formed on a surface of a thin film transistor substrate to be described, and the light blocking member is formed to cover a part in which a light reflecting material is formed on the thin film transistor substrate. Therefore, the light blocking member covers the thin film transistor, the gate line, and the data line formed inside the thin film transistor substrate (which is called a thin film transistor array) from an external side of the thin film transistor substrate.

When the gate line is formed in a horizontal (or row) direction and the data line is formed in a perpendicular (or column) direction, a horizontal line of the light blocking member may be formed at a position that corresponds to the gate line and a perpendicular line may be formed at a position that corresponds to the data line. A light blocking member may be formed on the surface of the thin film transistor substrate that corresponds to the non-display area of the liquid crystal display panel (in addition to covering of metal wires such as the gate line and the data line).

Referring to FIGS. 11-14, a part in which the light blocking member is not formed may correspond to an opening of the liquid crystal display panel. In an exemplary embodiment, the light blocking member may be formed to cover the non-display area.

A light blocking member 380 for preventing reflection by the thin film transistor or metal wires may be formed on an upper side of the second substrate 320. However, the light blocking member 380 may not be provided on the entire side of the upper side of the second substrate 320 but may be formed to cover a part in which the gate line and the data line arranged in a matrix form and the thin film transistor are formed. The light blocking member 380 may be provided on the entire side of the non-display area of the liquid crystal display panel 300.

The light blocking member 380 is classified as a light absorbing type and a light reflecting type depending on the light blocking material. For example, in an embodiment, the light blocking member 380 is the light absorbing type. The light blocking member 380 may be made of, for example, an organic material including a black pigment that is a light blocking pigment. For example, the light blocking member 380 may be formed with a light blocking member resin configured by mixing a carbon-group organic material into a photoresist made of a photo-polymerization initiator, a binder resin, a high-molecule monomer, or a solvent. The material of the light blocking member 380 may have an excellent visible ray blocking rate and an excellent adhesion characteristic.

Figure 15:
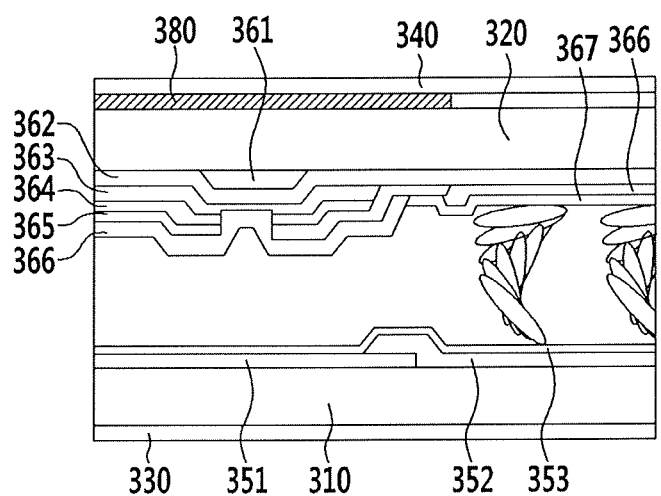
FIG. 15 shows a cross-sectional view of a vertical layer of a part in which a thin film transistor is provided in a liquid crystal display panel of the liquid crystal display of FIG. 11.
Figure 16:
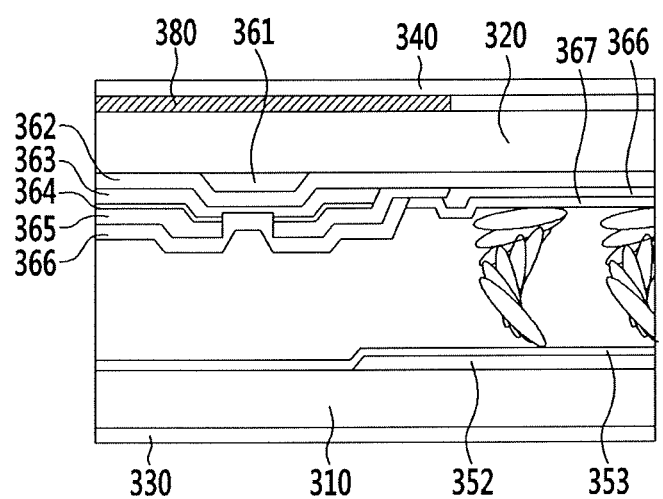
FIG. 16 shows a cross-sectional view of an exemplary variation of FIG. 15.

FIG. 15 shows a cross-sectional view of a vertical layer of a part in which a thin film transistor is provided in a liquid crystal display panel of a liquid crystal display of FIG. 11, and FIG. 16 shows a cross-sectional view of an exemplary variation of FIG. 15.

Referring to FIG. 15, a liquid crystal material is filled between the first substrate 310 that is a color filter substrate and the second substrate 320 that is a thin film transistor substrate, and a plurality of layers are formed above/below the substrate.

An internal light blocking member 351 and a color filter 352 are formed on the first substrate 310, and a common electrode 353 is formed thereon. A polarizer 330 is attached below the first substrate 310, and the light generated by the backlight unit is input to the liquid crystal display panel from the lower part of the polarizer 330.

A gate electrode 361, a gate insulating layer 362, a semiconductor 363, an ohmic contact 364, a source/drain electrode 365, and a passivation layer 366 are stacked on a part for forming a thin film transistor below the second substrate 320

A drain electrode of the thin film transistor is connected to a pixel electrode 367. Configured materials and functions of the respective layers and other layers that are not described here are well known to a person skilled in the art and they will be omitted.

A light blocking member 380 is formed at a part at which a thin film transistor is provided on the second substrate 320. The light blocking member 380 blocks external light and prevents reflection by the thin film transistor formed on a rear side of the second substrate 320. The light blocking member 380 may be formed to cover the gate line and the data line in addition to the thin film transistor.

A polarizer 340 is attached to the light blocking member 380. The light blocking member 380 is not formed on the entire side of the second substrate 320, but it has a thickness such that there may be a space between the second substrate 320 and the polarizer 340. A layer formed with a light-transmitting material may be formed with, for example, the same thickness as the light blocking member 380 in the space. A material that does not change an optical characteristic of the liquid crystal display panel may be used for the light-transmitting material.

Referring to FIG. 16, a configuration is exemplified in which the internal light blocking member 351 formed on the first substrate 310, and the color filter substrate as shown in FIG. 15, is not provided. The liquid crystal display panel 300 is installed such that the second substrate 320 may face the front and the light blocking member 380 formed on the upper side of the second substrate 320 can block light reflection by the thin film transistor so the light blocking member on the first substrate 310 may be omitted.

The light blocking member 380 may be formed not on the second substrate 320 but on the polarizer 340. For example, the light blocking member 380 may be formed on a side that faces the second substrate 320 from among respective sides of the polarizer 340. When the light blocking member 380 is formed on the polarizer 340, it may be formed to cover the non-display area of the liquid crystal display panel.

The light blocking member 380 may be formed on the substrate by using, for example, a roll printing method, particularly, gravure-offset printing or reverse-offset printing.

Figure 17:
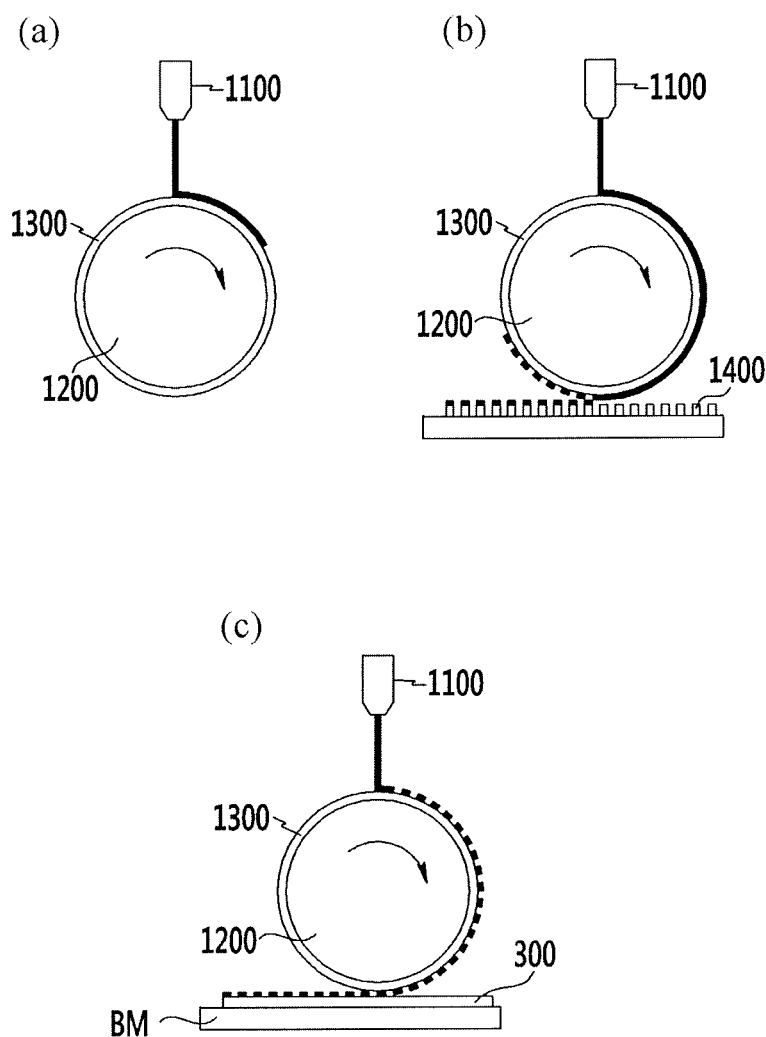
FIG. 17 shows a process for forming a light blocking member on a thin film transistor substrate of a liquid crystal display panel by a reverse offset printing.

FIG. 17 shows a process for forming a light blocking member on a thin film transistor substrate of a liquid crystal display panel by reverse offset printing.

The light blocking member formed by the reverse offset printing is formed by, for example, (a) coating a material of the light blocking member coming through a nozzle 1100 on a surface of a blanket 1300 by rotating a blanket roll 1200, (b) allowing the blanket 1300 to contact a cliché 1400 formed in intaglio in which a pattern corresponding to the light blocking member pattern to be formed is generated, and the remaining light blocking member pattern to be formed on the surface of the blanket 1300, and (c) transferring the light blocking member pattern onto the surface of the thin film transistor substrate of the liquid crystal display panel 300.

The thin film transistor may be formed with, for example, a low-reflection metal as a method for reducing light reflection caused by the thin film transistor array. For example, the low-reflection metal may be titanium (Ti)/indium zinc oxide (IZO)/copper (Cu), but exemplary embodiments of the present invention are not limited thereto. Alternatively, in an embodiment, the low-reflection polarizer 340 with light reflectance that is lower than a conventional polarizer may be attached to the upper side of the thin film transistor substrate 320.

Formation of the light blocking member for preventing light reflection, usage of a low-reflection metal, and usage of a low-reflection polarizer may be applicable independently or in combination.

TABLE 1

| | Reflectance (%) | Reflection color coordinates Bx/By | Gap |
|---|---|---|---|
| Test 1 (Ti/Cu TFT + BM) | 1.85 | 0.432/0.406 | Ref |
| Test 2 (Ti/Cu TFT + low-reflection polarization layer) | 3.66 | 0.453/0.404 | 0.021/−0.002 |
| Test 3 (Ti/IZO/Cu TFT) | 2.99 | 0.453/0.401 | 0.021/−0.005 |
| Test 4 (Ti/IZO/Cu TFT + low-reflection polarization layer) | 2.83 | 0.443/0.407 | 0.011/0.001 |
| Comparative Example (Ti/Cu TFT) | 3.82 | 0.463/0.398 | 0.031/−0.008 |

Table 1 expresses a simulation result of a reflection characteristic of a thin film transistor substrate surface of an 8-line and 55-inch liquid crystal display panel. Test 1 represents a case in which a light blocking member is formed on a surface of a conventional thin film transistor substrate. Test 2 represents a case in which a low-reflection polarization layer is attached to a conventional thin film transistor substrate. Test 3 represents a case in which a low-reflection metal (Ti/IZO/Cu) thin film transistor is formed. Test 4 represents a case in which a low-reflection metal thin film transistor is formed and a low-reflection polarization layer is attached. The comparative example represents a case in which a conventional thin film transistor substrate is not changed. The case in which the light blocking member is formed generates the best effect and shows a substantial reflectance reduction of about 2%. Further, the case in which the low-reflection metal or the low-reflection polarization layer is used, a color coordinate difference may be generated.

Figure 18:
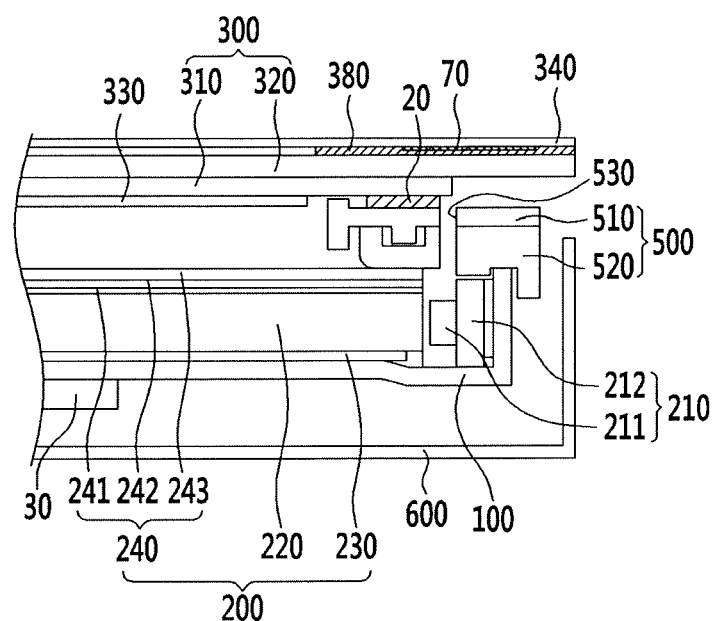
FIG. 18 shows a cross-sectional view of the liquid crystal display of FIG. 11 with respect to a line E-E'.
Figure 19:
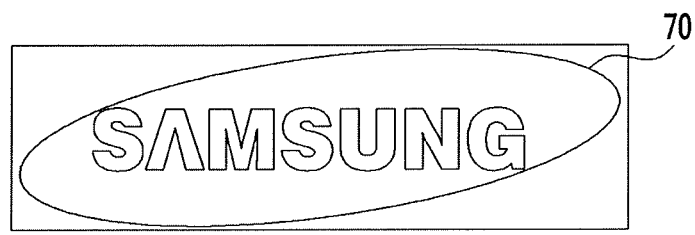
FIG. 19 shows a logo in the liquid crystal display of FIG. 11.

FIG. 18 shows a cross-sectional view of a liquid crystal display of FIG. 11 with respect to a line E-E', and FIG. 19 shows a logo in a liquid crystal display of FIG. 11.

Referring to FIG. 11, FIG. 18, and FIG. 19, a logo 70 may be provided to one edge of the liquid crystal display panel. The logo 70 may be formed by, for example, printing a material that deteriorates transmission of light on one side (e.g., a side that faces the second substrate 320) of the polarizer 340 or the upper side of the second substrate 320.

An opening 530 is formed at a position of the mold structure 500 that substantially corresponds to the logo 70. By this, part of the light irradiated from the light source 210 of the backlight assembly through the opening 530 of the mold structure 500 may proceed to the logo 70 of the liquid crystal display panel and transmits through the logo 70 so the logo 70 may be visible. Therefore, no additional light source for shedding light to the logo 70 is needed.

The adhesive member 20 may not be provided at a position that corresponds to the opening 530 of the mold structure 500 so that the opening 530 may not be covered. The light blocking member 380 may not be provided at a position that corresponds to the logo 70. Depending on an exemplary embodiment, the light blocking member 380 may not be provided in a region in which the logo 70 is not provided.

Figure 20:
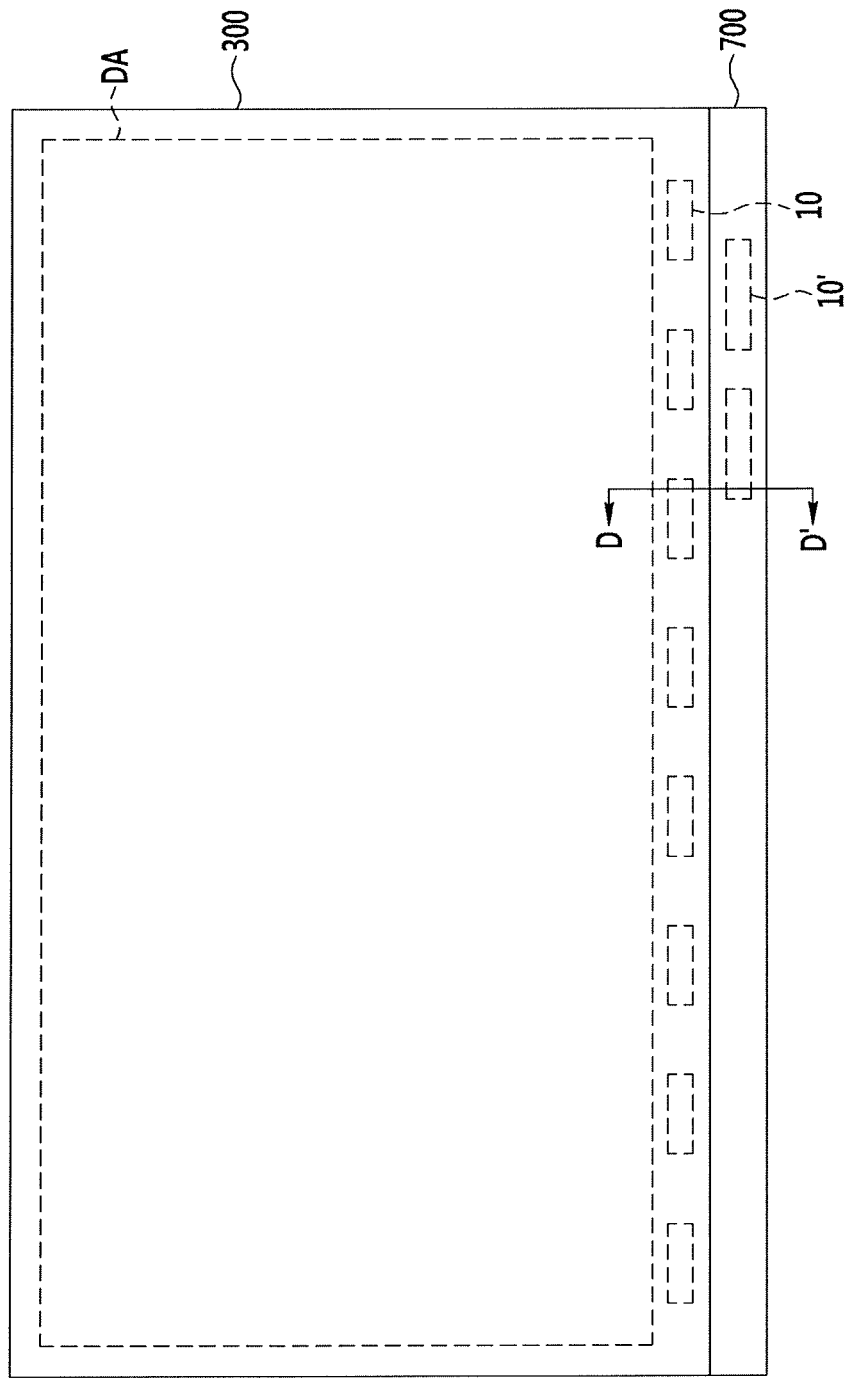
FIG. 20 shows a layout view of a liquid crystal display according to an exemplary embodiment of the present invention.
Figure 21:
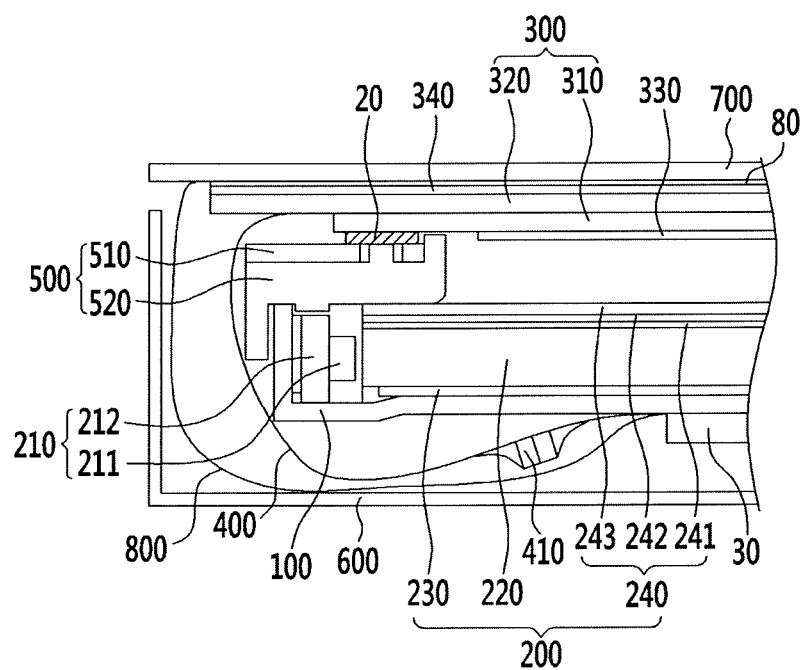
FIG. 21 shows a cross-sectional view of the liquid crystal display of FIG. 20 with respect to a line D-D'.

FIG. 20 shows a layout view of a liquid crystal display according to an exemplary embodiment of the present invention, and FIG. 21 shows a cross-sectional view of a liquid crystal display of FIG. 20 with respect to a line D-D'.

Differing from the described exemplary embodiment, a touch sensor panel 700 is provided on the liquid crystal display panel 300 in the present exemplary embodiment. Three edges of the touch sensor panel 700 may substantially correspond to three edges of the liquid crystal display panel 300, and the bottom edge may be extended to exceed the bottom edge of the liquid crystal display panel 300. Therefore, in the viewpoint of the front, the liquid crystal display panel 300 may be completely covered by the touch sensor panel 700. An attaching layer 80 for attaching the touch sensor panel 700 may be provided between the touch sensor panel 700 and the liquid crystal display panel 300.

Regarding the touch sensor panel 700, an attaching region 10' for attaching a signal connection line 800 for transmitting a driving signal and/or a detection signal may be provided on the bottom edge that is extended longer than the liquid crystal display panel 300. The signal connection line 800 provided on the flexible printed circuit board includes, for example, a first terminal attached to a lower side of the touch sensor panel 700 and a second terminal connected to a printed circuit board (PCB) 30 provided on the lower side of the bottom chassis 100. Therefore, the signal connection line 800 may be bent to wrap part of a lateral side of the mold structure 500, a lateral side of the bottom chassis 100, and a lower side of the bottom chassis 100. A vertical portion of the shield cover 600 for protecting the signal connection line 800 as well as the driving connection line 400 may be installed to not digress from the edge of the touch sensor panel 700.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A liquid crystal display comprising:
a bottom chassis;
a backlight assembly received in the bottom chassis;
a liquid crystal display panel including a thin film transistor substrate and a counter substrate disposed opposite to the thin film transistor substrate, the liquid crystal display panel being disposed so that the counter substrate is positioned between the backlight assembly and the thin film transistor substrate;
a mold structure disposed between the bottom chassis and the liquid crystal display panel, and configured to fasten the liquid crystal display panel to the bottom chassis;
a driving connection line connected to the thin film transistor substrate; and
a shield case covering the driving connection line to protect the driving connection line, overlapping the liquid crystal display panel in a direction perpendicular to a plane of the liquid crystal display panel, and being disposed so that the shield case does not go beyond an edge of the liquid crystal display panel.

2. The liquid crystal display of claim 1, wherein the driving connection line is a flexible printed circuit board which has a first terminal attached to a lower side of the thin film transistor substrate and a second terminal attached to a printed circuit board disposed on a lower side of the bottom chassis.

3. The liquid crystal display of claim 1, wherein the mold structure includes an upper mold and a lower mold, the upper mold including a horizontal portion and a vertical portion and the lower mold including a horizontal portion and a vertical portion, and a lower side of the liquid crystal display panel is fixed to an upper side of the horizontal portion of the upper mold.

4. The liquid crystal display of claim 3, wherein the liquid crystal display panel is attached to the upper mold through an adhesive member.

5. The liquid crystal display of claim 3, further comprising: a protrusion is disposed on one of the horizontal portion of the upper mold and the horizontal portion of the lower mold, and a groove or hole corresponding to the protrusion is disposed on the other of the horizontal portion of the upper mold and the horizontal portion of the lower mold.

6. The liquid crystal display of claim 3, wherein the vertical portion of the upper mold and the vertical portion of the lower mold are alternately fixed to a lateral side of the bottom chassis.

7. The liquid crystal display of claim 6, wherein the vertical portion of the upper mold and the vertical portion of the lower mold are fastened to a hook disposed on the lateral side of the bottom chassis.

8. The liquid crystal display of claim 3, wherein the vertical portion of the lower mold is fixed to a lateral side of the bottom chassis and the horizontal portion of the upper mold is fixed to a lateral side of the lower mold.

9. The liquid crystal display of claim 3, wherein the vertical portion of the upper mold and the vertical portion of the lower mold extend downward to a bottom of a lateral wall of the bottom chassis.

10. The liquid crystal display of claim 3, wherein the vertical portion of the upper mold and the vertical portion of the lower mold do not extend substantially downward at a position through which the driving connection line passes.

11. The liquid crystal display of claim 1, further comprising: a light blocking member disposed on an external side of the thin film transistor substrate.

12. The liquid crystal display of claim 11, wherein the light blocking member is disposed on the external side of the thin film transistor substrate so as to cover a part that includes a light reflecting material disposed inside the thin film transistor substrate.

13. The liquid crystal display of claim 12, wherein the part including the light reflecting material includes a thin film transistor, a gate line, and a data line.

14. The liquid crystal display of claim 11, wherein the light blocking member is disposed on a surface of the thin film transistor substrate so as to cover the thin film transistor, the gate line, the data line, and a non-display area of the liquid crystal display panel.

15. The liquid crystal display of claim 11, further comprising: a black matrix disposed on the thin film transistor substrate of the liquid crystal display panel.

16. The liquid crystal display of claim 1, wherein the thin film transistor substrate includes a plurality of thin film transistors which include a low-reflection metal.

17. The liquid crystal display of claim 1, further comprising: a low-reflection polarizer disposed on an upper side of the thin film transistor substrate.

18. The liquid crystal display of claim 1, further comprising: a polarizer disposed on an upper side of the thin film transistor substrate, and including at least one edge coated with a light blocking material.

19. The liquid crystal display of claim 1, further comprising:

a polarizer disposed on an upper side of the thin film transistor substrate, and including an edge on which a logo is printed, and the mold structure having an opening disposed in a position that substantially corresponds to the logo.

* * * * *